United States Patent [19]
Dumas et al.

[11] Patent Number: 5,353,365
[45] Date of Patent: Oct. 4, 1994

[54] MULTI-WAVEGUIDE CYLINDRICAL OPTICAL CONDUCTOR FOR TELECOMMUNICATIONS CABLE AND METHOD OF MAKING SAME

[75] Inventors: Jean-Pierre Dumas, Villemoisson sur Orge; Robert Jocteur, Lyons, both of France

[73] Assignee: Alcatel Cable, Clichy Cedex, France

[21] Appl. No.: 26,833

[22] Filed: Mar. 5, 1993

[30] Foreign Application Priority Data

Mar. 6, 1992 [FR] France ................. 92 02728

[51] Int. Cl.$^5$ .............. G02B 6/44; G02B 6/22; C03C 25/02
[52] U.S. Cl. .................. 385/102; 385/114; 385/123; 385/126; 385/142; 65/409; 65/425; 65/430
[58] Field of Search ............... 385/102, 114, 115, 116, 385/120, 123, 126, 127, 128, 141, 142, 144; 65/3.1, 3.11, 3.12, 4.1, 4.2, 4.3

[56] References Cited

U.S. PATENT DOCUMENTS

| | | | |
|---|---|---|---|
| 3,503,666 | 3/1970 | Moore et al. | 385/120 X |
| 4,229,197 | 10/1980 | Streng | 65/4.11 X |
| 4,615,583 | 10/1986 | Tsuno et al. | 385/126 X |
| 4,653,852 | 3/1987 | Suzuki et al. | 385/126 X |
| 4,690,500 | 9/1987 | Hayami et al. | 385/128 X |
| 4,828,349 | 5/1989 | Nakasuji | 385/126 X |
| 4,973,129 | 11/1990 | Fukuzawa et al. | 385/126 X |
| 5,259,059 | 11/1993 | Abramov | 385/126 X |

FOREIGN PATENT DOCUMENTS 0391742 10/1990 European Pat. Off. ........ 65/3.11 X

OTHER PUBLICATIONS

Patent Abstracts of Japan, vol. 11, No. 30 (C-400) Jan. 29, 1987 & JP-A-61 201 633 (Sumitomo Electric) Sep. 6, 1986.
Patent Abstracts of Japan, vol. 6, No. 106 (C-108) (984) Jun. 16, 1982 & JP-A-57 038 331 (Nippon Denshin Denwa Kosha) Mar. 3, 1982.
Patent Abstracts of Japan, vol. 12, No. 5 (C-467)(2852) Jan. 8, 1988 & JP-A-62 162 633 (Hitachi Cable) Jul. 1987.
Patent Abstracts of Japan, vol. 9, No. 89 (C-275) (1805) Apr. 11, 1985 & JP-A-59 217 632 (Furukawa Denki Kogyo) Dec. 7, 1984.

*Primary Examiner*—Brian Healy
*Attorney, Agent, or Firm*—Sughrue, Mion, Zinn, Macpeak & Seas

[57] ABSTRACT

A multi-waveguide cylindrical optical conductor for telecommunications cable, the conductor comprising a plurality of optical fibers, each of which is a unit cylindrical fiber constituted by a core and by cladding, the unit fibers are all connected together by silica after a fiber-drawing operation, wherein said core of said unit cylindrical fiber has a diameter of about 8 μm to 10 μm, wherein said cladding has an outside diameter lying in the range 25 μm to 35 μm, and wherein all of the cores of said unit fibers are either situated regularly on generator lines of a cylinder having the same axis as said conductor, or else are parallel with one another and are coplanar. An optical conductor can thus be obtained having an outside diameter of 125 μm and containing six waveguides each having a diameter of about 25 μm to 35 μm.

6 Claims, 4 Drawing Sheets

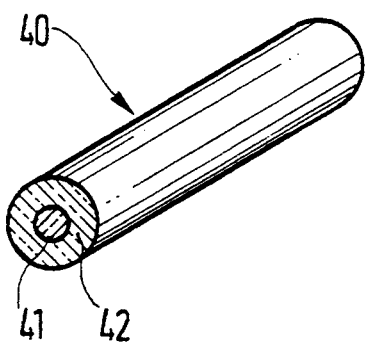
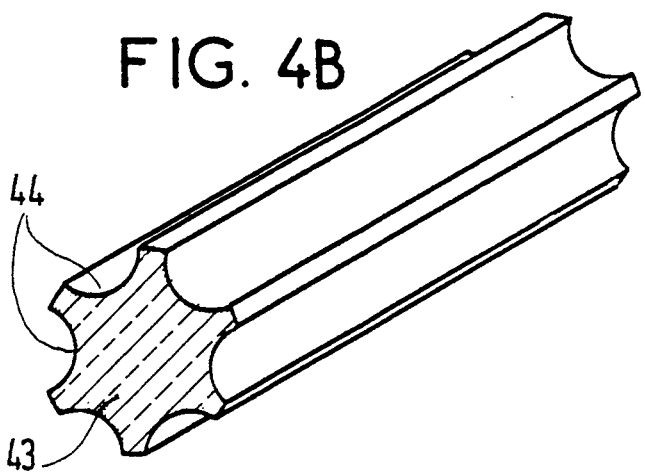
FIG. 4A  FIG. 4B
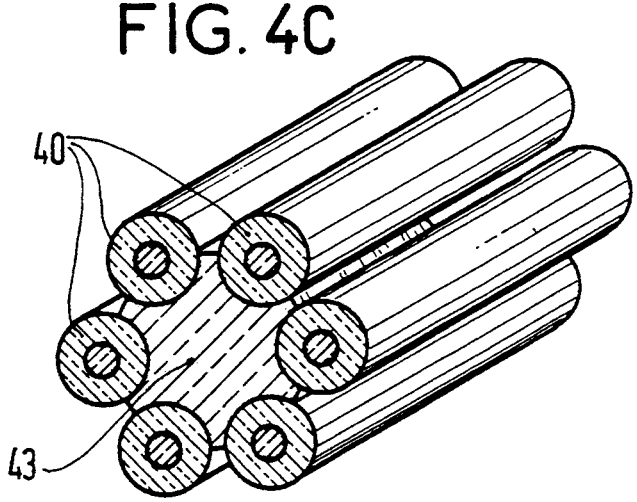
FIG. 4C
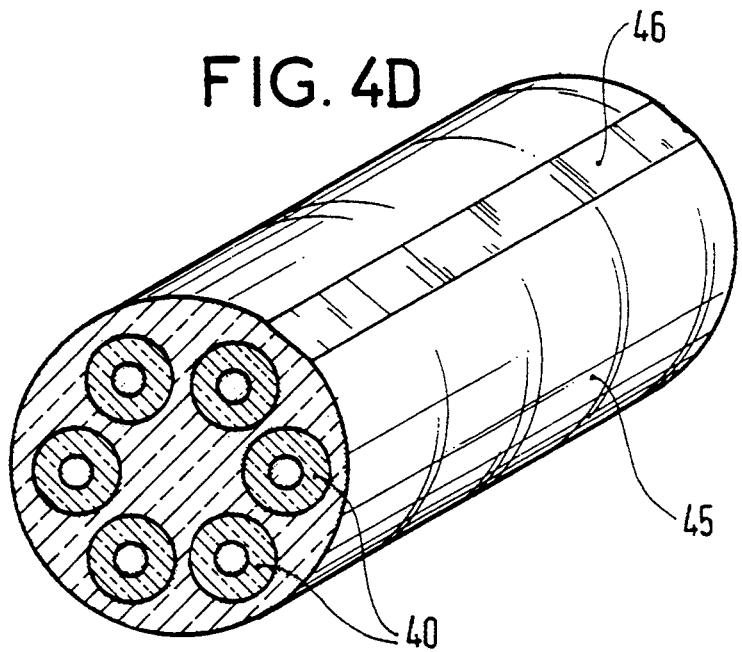
FIG. 4D

MULTI-WAVEGUIDE CYLINDRICAL OPTICAL CONDUCTOR FOR TELECOMMUNICATIONS CABLE AND METHOD OF MAKING SAME

The present invention relates to a multi-waveguide cylindrical optical conductor for telecommunications cables.

BACKGROUND OF THE INVENTION

Presently-known multi-waveguide optical conductors are generally in the form of tapes containing 4, 6, 10, 12, or 18 conventional individual optical fibers embedded in a resin. Each conventional individual fiber comprises a core and optical cladding based on silica and having an outside diameter of the order of 40 $\mu$m. The optical cladding is itself surrounded by a layer of silica having an outside diameter of 125 $\mu$m which is covered with a plurality of organic protective layers to a total outside diameter equal to about 250 $\mu$m.

By way of example, the minimum known transverse dimensions for a six-fiber tape are about 1.65 mm by 0.3 mm. Given the large number of tapes used in building up an optical cable, it is essential to improve the compactness of such tapes.

A multicore optical fiber is also known, as described in the article by Ryszard S. Romaniuk and Jan Dorosz entitled "Coupled/non-coupled wave transmission in long length of multicore optical fibers" published in the 10th Meeting of European ECOC 84, Stuttgart, pp. 202-203. During fiber-drawing, the core glass of the preform passes through a multihole diaphragm; that method is difficult and expensive and it gives rise to a fiber having a plurality of cores that are deformed.

OBJECT AND SUMMARY OF THE INVENTION

An object of the present invention is to provide a multi-waveguide optical conductor structure for telecommunications cables making it possible to improve the compactness of optical cables considerably, and which is also easy to manufacture.

The present invention provides a multi-waveguide cylindrical optical conductor for telecommunications cable, the conductor comprising a plurality of optical fibers, each of which is a unit cylindrical fiber constituted by a core and by cladding, the unit fibers are all connected together by silica after a fiber-drawing operation, wherein said core of said unit cylindrical fiber has a diameter of about 8 $\mu$m to 10 $\mu$m, whererin said cladding has an outside diameter lying in the range 25 $\mu$m to 35 $\mu$m, and wherin all of the cores of said unit fibers are either situated regularly on generator lines of a cylinder having the same axis as said conductor, or else are parallel with one another and are coplanar.

A ratio of about 3 for the cladding diameter to the core diameter suffices to avoid cross-talk. The use of a dry synthetic silica is preferable to avoid migration of moisture, which degrades the looked-for quality of transmission.

Advantageously, an optical conductor of the invention has a mark on its outside face suitable for distinguishing the unit fibers it contains.

Any embodiment of an optical conductor of the invention may be provided with at least one protective polymer coating.

According to the invention, a six-fiber cylindrical optical conductor is made, for example, having an outside diameter of about 125 $\mu$m, with an organic coating whose outside diameter is about 250 $\mu$m. If these dimensions are compared with those of the above-mentioned six-fiber tape, it can be seen that bulk has been reduced by a factor of six compared with the most compact pre-existing tapes.

The present invention also provides a method of manufacturing a multi-waveguide optical conductor as defined above. According to the method, said fiber-drawing operation is performed on a preform that includes as many unit preforms as there are unit fibers, with the shape of said preform being geometrically similar to that of said waveguide.

In a preferred implementation, said preform is made from a cylindrical silica rod having a plurality of fluting-Grooves running along director lines in its outside surface, with said unit preforms being partially received therein; said preform is then given a regular cylindrical outside shape by adding grains of silica using a plasma technique covering method that is known per se.

In another implementation, said preform is made from a cylindrical silica rod having a plurality of fluting-grooves running along director lines in its outside surface in which said unit preforms are received in part; said preform is then given a regular cylindrical outside shape by being inserted in a pre-machined silica tube whose inside wall fits substantially over the configuration of said rod associated with said unit preforms. Finally, a swaging operation is performed.

In another implementation, said unit preforms are disposed parallel to one another with their axes coplanar in fluting-grooves provided in the diametral planes of two silica half-cylinders.

The method of the invention is much simpler to implement than previously known methods for making multicore fiber. Compared with the method of making a multifiber tape, the method of the invention provides considerable savings with respect to the amount of silica used, the time required for manufacturing the preforms, and the time required for making the organic coatings. In addition, it is possible obtain a waveguide of excellent quality since the fibers are accurately positioned and can be identified relative to one another, which is essential for connection purposes. The cores are positioned relative to one another with an error of less than one micrometer.

BRIEF DESCRIPTION OF THE DRAWINGS

Other features and advantages of the present invention appear from the following description of embodiments given by way of non-limiting example. In the accompanying drawings:

FIGS. 4A to 4D are perspective diagrams showing the various elements used to implement the preferred method of the invention, when making the conductor shown in FIG. 2:

FIG. 4A shows a unit cylindrical preform for a unit cylindrical fiber;

FIG. 4B shows a silica rod having fluting-grooves;

FIG. 4C shows the FIG. 4B rod associated with six unit cylindrical preforms as shown in FIG. 4A;

FIG. 4D shows the elements of FIG. 4C after silica has been coated thereon using a plasma type technique, thus defining a preform for obtaining an optical fiber as shown in FIG. 2;

MORE DETAILED DESCRIPTION

Figure 1:
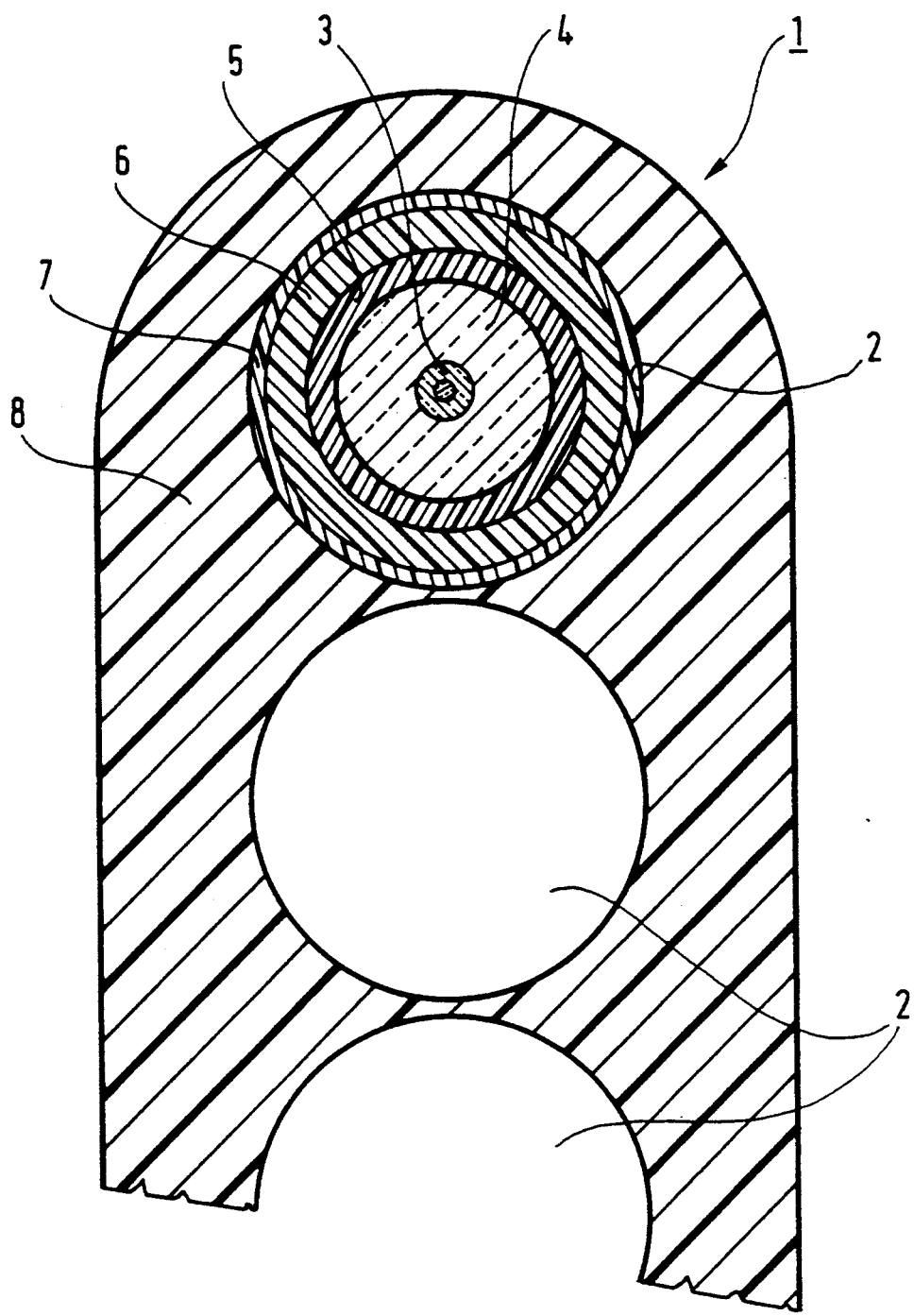
FIG. 1 is a diagrammatic fragmentary section through a prior art tape having six optical fibers.
Figure 2:
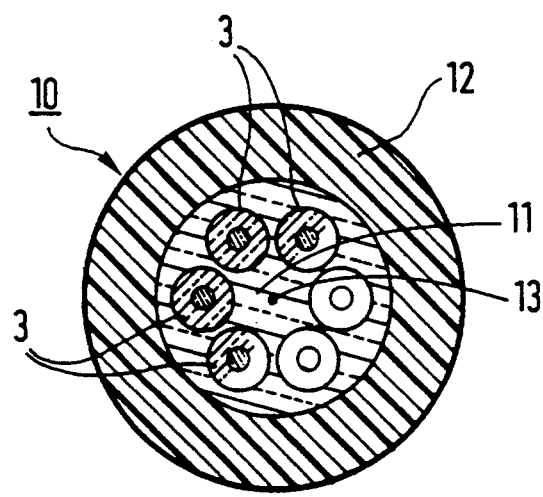
FIG. 2 is a diagrammatic section of a six-waveguide optical conductor of the invention, drawn to substantially the same scale as the tape of FIG. 1.

FIGS. 1 and 2 are at substantially the same scale, showing respectively a prior art tape 1 having six optical fibers and an optical conductor 10 of the invention.

The tape 1 is made up of six conventional individual fibers 2 each comprising:

an optical waveguide 3 constituted by a core and by optical cladding having an outside diameter substantially equal to 40 $\mu$m;

a silica layer 4 having an outside diameter substantially equal to 125 $\mu$m;

a primary organic coating 5 having an outside diameter of about 190 $\mu$m;

a secondary organic coating 6 having an outside diameter of about 250 $\mu$m; and a layer of colored resin 7 having an outside diameter of about 255 $\mu$m.

The six individual fibers are grouped together and covered by resin 8 so as to define a tape 1. The cross-section of this tape has a width of about 0.37 mm and a length of about 1.65 mm.

The optical conductor 10 of FIG. 2 is a cylinder having an axis 13. It includes six unit fibers or waveguides 3 having an outside diameter of 35 $\mu$m, analogous to the waveguides 3 of FIG. 1, and having their axes situated on a cylinder about the axis 13. These unit fibers 3 are interconnected by silica 11. Together they define a cylindrical assembly having a diameter of 125 $\mu$m. The silica is preferably a dry synthetic silica. The assembly is coated with one or more polymer protective layers, given an overall reference 12 and having an outside diameter of about 250 $\mu$m.

FIGS. 1 and 2 are drawn to substantially the same scale and thus show very clearly the saving with respect to bulk that is obtained by the invention for the same number of optical waveguides.

Figure 3:
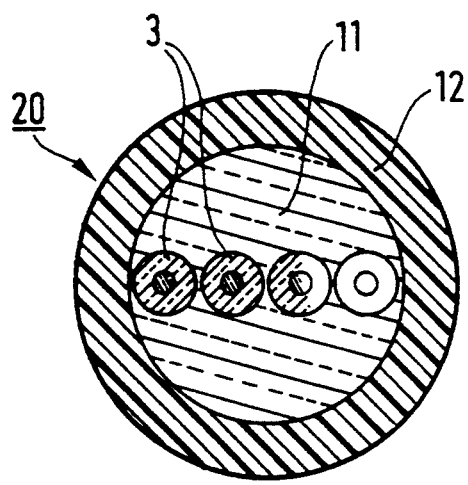
FIG. 3 is a diagrammatic section view through a variant optical conductor of the invention having four waveguides.

FIG. 3 shows a variant that is less compact than that of FIG. 2, but is nevertheless highly advantageous compared with the prior art. The optical conductor 20 of FIG. 3 has four unit fibers or waveguides 3 connected together by silica 11, with the assembly being protected by a polymer coating 12.

The conductor 10 of FIG. 2 is advantageously made using a method illustrated diagrammatically in FIGS. 4A to 4D.

FIG. 4A shows a unit preform 40 corresponding to a unit fiber 3 having core glass 41 and cladding glass 42. By way of example, a unit preform 40 may have a diameter of 18 mm and a length of 800 mm.

FIG. 4B shows a silica rod 43 whose outside face is machined to have six fluting-grooves 44 of depth substantially equal to one millimeter, and intended to receive six unit preforms 40, as shown in FIG. 4C.

Using a conventional method, the assembly of FIG. 4C is covered in silica by a plasma technique so as to impart a regular cylindrical shape 45 thereto, as shown in FIG. 4D. By way of example, one method of this kind is described in the article by R. Dorn and C. Le Sergent entitled "Preform Technologies for Optical Fibers" published in Electrical Communication, Vol. 62, No. ¾ 1988, page 238; it is known under the initials ALDP for: "Axial and Lateral Plasma Deposition".

Reference 46 designates a flat which will be found on the conductor after fiber-drawing and which is used for identifying the order of the unit fibers when a connection is made between two conductors.

A preform 45 is thus made which is capable of being subjected to fiber-drawing like a conventional preform. This method is suitable for obtaining an optical conductor having a length of 300 km, and thus 1,800 km of waveguide.

Figure 5:
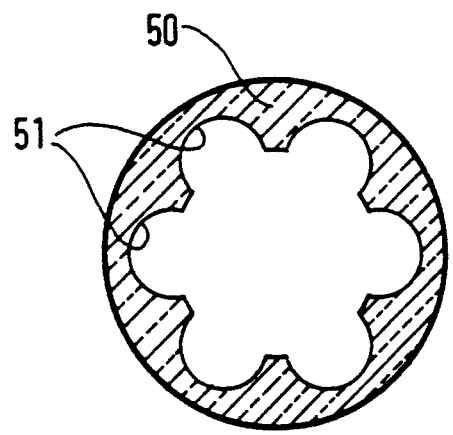
FIG. 5 is a diagrammatic section through a pre-machined tube for use in making a variant of the preform for making an optical conductor of the invention of the type shown in FIG. 2.

In a variant implementation of the above method, a preform analogous to the preform 45 is obtained from the assembly of FIG. 4C which is then inserted in a tube 50 shown diagrammatically in section in FIG. 5. The inside wall of the tube 50 is machined so as to have six gutters 51 for receiving the unit preforms 40. The preforms are positioned with sufficient accuracy by the fluted central rod 43. The resulting assembly is swaged to provide a preform that is directly suitable for fiber-drawing.

Figure 6:
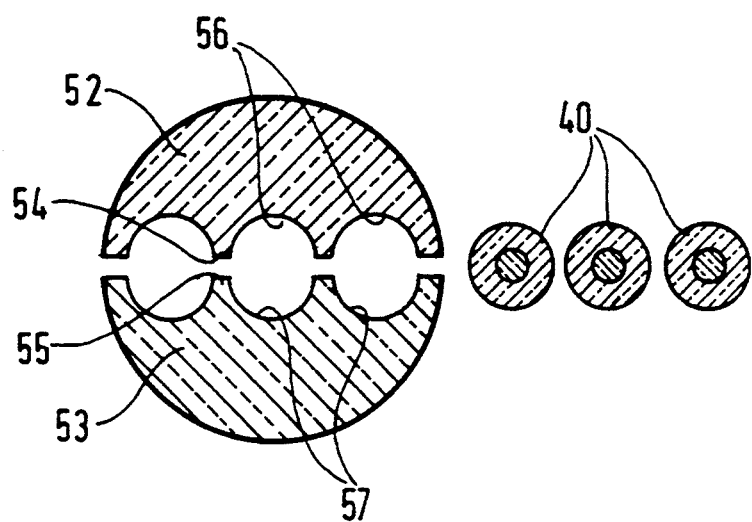
FIG. 6 is a diagrammatic section through another variant preform for use in making an optical conductor of the invention, this time of the type shown in FIG. 3.

FIG. 6 is a diagram showing how a preform for making a conductor of the type shown in FIG. 3 (this time with three waveguides) can be made easily. Two identical pieces of silica are machined, that together define a cylinder, and that have diametral planes 54 and 55 which are machined so as to have complementary fluting-grooves 56 and 57 for receiving the unit preforms 40.

Naturally, the invention is not limited to the implementations described above. Without going beyond the scope of the invention, it is possible to replace any disposition with an equivalent disposition.

What is claimed is:

1. A method of manufacturing a multi-waveguide optical conductor, the conductor comprising a plurality of optical fibers, each of which is a unit cylindrical fiber constituted by a core and by a cladding the unit fibers being all connected by silica after a fiber drawing operation, wherein:

said fiber-drawing operation is performed on the basis of a preform including as many unit preforms as there are unit fibers, the shape of said performs being geometrically similar to that of said waveguide;

said preform is made from a cylindrical silica rod having a plurality of fluting-grooves in its outside surface extending along generator lines and having said unit preforms received partially therein; and said preform is given a regular cylindrical outside shape by coating it with grains of silica using a plasma technique coating method.

2. A method of manufacturing a multi-waveguide optical conductor, the conductor comprising a plurality of optical fibers, each of which is a unit cylindrical fiber constituted by a core and by a cladding the unit fibers being all connected by silica after a fiber drawing operation, wherein said fiber-drawing operation is performed on the basis of a preform including as many unit preforms as there are unit fibers, the shape of said preforms being geometrically similar to the of said waveguide;

said preform is made from a cylindrical silica rod having a plurality of fluting-grooves in its outside surface extending along generator lines and having said unit preforms received partially therein;

said preform is given a regular cylindrical outside shape by being inserted in a pre-machined silica tube whose inside wall fits substantially over the shape of said rod associated with said unit preforms; and swaging is then performed.

3. A method of manufacturing a multi-waveguide optical conductor, the conductor comprising a plurality of optical fibers, each of which is a unit cylindrical fiber constituted by a core and by a cladding, the unit fibers being all connected by silica after a fiber drawing operation, wherein:

said fiber-drawing operation is performed on the basis of a preform including as many unit preforms as there are unit fibers, the shape of said preforms being geometrically similar to that of said waveguide; and said unit preforms are disposed parallel to one another with their axes coplanar in fluting-grooves provided in the diametral planes of two silica semi-cylinders.

4. A method according to claims 1, 2 or 3, wherein said optical conductor is provided with at least one protective polymer coating.

5. A method according to claim 1, 2 or 3, wherein an outside face of said optical conductor has a marker suitable for distinguishing the unit fibers it contains.

6. A method according to claim 1, 2 or 3, wherein an outside face of said optical conductor has a marker suitable for distinguishing the unit fibers it contains.

* * * * *